US012748847B2

(12) United States Patent
Sorenson et al.

(10) Patent No.: US 12,748,847 B2
(45) Date of Patent: Sep. 29, 2026

(54) LOAD AND DUMP AS A SINGLE FUNCTION

(71) Applicant: UNISYS CORPORATION, Blue Bell, PA (US)

(72) Inventors: Ellen L. Sorenson, Roseville, MN (US); Kelsey L. Bruso, Eagan, MN (US)

(73) Assignee: Unisys Corporation, Blue Bell, PA (US)

(*) Notice: Subject to any disclaimer, the term of this patent is extended or adjusted under 35 U.S.C. 154(b) by 36 days.

(21) Appl. No.: 18/820,049

(22) Filed: Aug. 29, 2024

(65) Prior Publication Data

US 2026/0064843 A1 Mar. 5, 2026

(51) Int. Cl.
*G06F 21/56* (2013.01)
*G06F 21/60* (2013.01)

(52) U.S. Cl.
CPC .......... *G06F 21/568* (2013.01); *G06F 21/602* (2013.01)

(58) Field of Classification Search
CPC ............................. G06F 21/568; G06F 21/602
See application file for complete search history.

(56) References Cited

U.S. PATENT DOCUMENTS 10,860,540 B1 12/2020 Ugur-Ozekinci et al.
2009/0125568 A1* 5/2009 Nishikawa .......... G06F 11/1471
2017/0109421 A1* 4/2017 Stearn .................. G06F 16/258
2020/0249877 A1 8/2020 McIlroy et al.
2020/0351347 A1* 11/2020 Chang ................ G06F 9/45558
2022/0066993 A1 3/2022 Khanuja et al.
2023/0066110 A1* 3/2023 Bodziony ......... G06F 16/24535
2023/0076260 A1 3/2023 Poorebrahim Gilkalaye et al.
2024/0256670 A1* 8/2024 Jindal .................. G06F 21/554

OTHER PUBLICATIONS

International Search Report and Written Opinion received for PCT Patent Application No. PCT/US2025/043552, mailed on Nov. 4, 2025, 12 pages.

* cited by examiner

*Primary Examiner* — Sangseok Park
(74) *Attorney, Agent, or Firm* — Shook, Hardy & Bacon L.L.P.

(57) ABSTRACT

Embodiments of the present disclosure include systems and methods for optimizing functions of a database system. A combination load and dump function is recited that transforms a first set of backup data into a set of transformed data, where the first set of backup data is accessed in response to receiving a request to load the first set of backup data to the database. A set of operations is automatically executed and includes loading the database with the set of transformed data and storing the set of transformed data in a second set of backup data. This combination load and dump function removes the need for a subsequent read function to read data previously loaded to a database file in order to perform the dump function.

17 Claims, 5 Drawing Sheets

LOAD AND DUMP AS A SINGLE FUNCTION

BACKGROUND

Databases may hold large stores of data and require the use of many different functions to load, write, read, and generate backups of data. The data stored in these databases can be compromised in many ways such as software or hardware failure, or due to a hack. When data needs to be restored to a certain point in time prior to the compromise, backup files may be used to repopulate the database. If a new backup needs to be created after a restore, or even after new data is uploaded for the first time, a dump action must be performed to generate a new backup file. This conventionally occurs after the new or restored data is written to the database file.

SUMMARY

The present disclosure relates to systems and methods for optimizing various functions of a database system through utilizing a combination load and dump function, which removes the need for separate functions to read previously loaded data from a database file. According to various aspects of the technology, when data is loaded to a database file either through a load function, recover function, or any other function that inserts new data into a database or returns a database to a previous status or state in time, it may be advantageous to create a new backup reflecting the inserted or recovered data. Conventionally, this may require the use of a separate dump function, which requires that the inserted or recovered data be read from the database. The described technology removes the need for this additional read function by creating a combination load and dump function. The combination load and dump function automatically executes a set of operations that load the database with a set of transformed data and stores the set of transformed data in a second set of backup data. This is accomplished without the need for separate load and dump functions.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
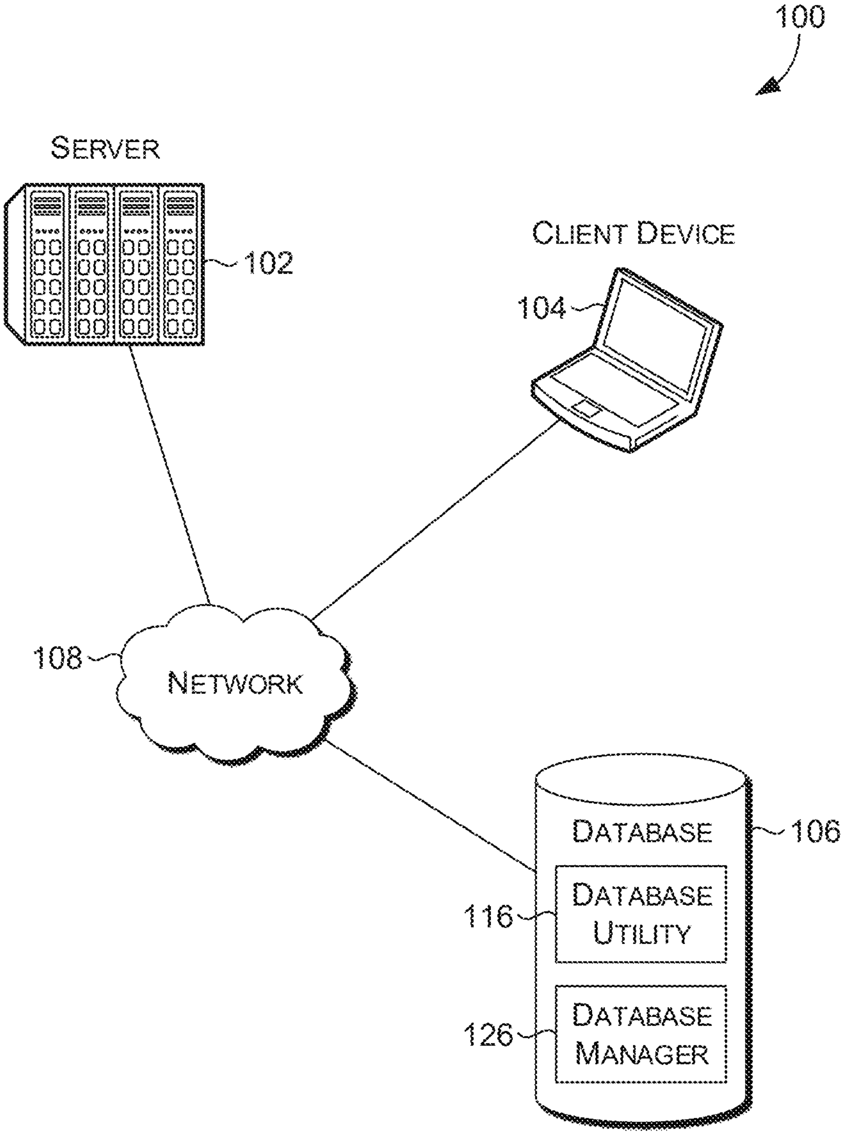
FIG. 1 is an example general operating environment suitable for transmitting data to and storing data in a database, in accordance with an aspect described herein.

By way of background, there are many functions that allow a database administrator to interact with a database. For example, one function is the load function, which transfers data from an external source, or overwrites a database file from a previous backup of the database. Additional functions that may be used to insert data into a database include insert and update functions. Throughout this disclosure, the term "load" is used to represent any form of function that causes the insertion of data into a database from any source. A load function may also cause significant transformation of data during the loading process, for example encryptions or converting data into different forms such as integer to Boolean. Another example function is dump, which creates a backup of the current state of a database file. These backups may then be utilized when a database needs to be restored to a previous point in time, such as prior to a database being compromised, or may be utilized when transferring data outside of the database. These backups may also be referred to as "snapshots" and may be comprised of compressed files to reduce overall file size.

Conventionally, the dump function may be used to generate a backup of the database after new data or previous backup data is written to the database through the use of a load function. But as discussed above, the load function may cause significant transformation to the data being loaded. Using conventional solutions, a dump function is executed after data has been loaded into a database and transformed into the form designated within the database. This requires four separate operations, namely: read each data item from the first backup file; transform and write each data item to the database file; read each data item from the database file; and write each data item to a second backup file. Additionally, conventional recover functions require six separate operations, namely: read each data item from the first backup file; transform and write each data item to the database file; read each incremental update item from the database log; write each incremental update data item to the database file; read each data item from the database file; and write each data item to a second backup file. In examples in which transforming and writing the data to the database require encrypting the backup data or unencrypting the backup data, writing the data to the second backup may require extra computational time and resources to either encrypt or unencrypt such that it is in the form required for the writing of the data to the second backup. Additionally, a database manager may cache the data into cache memory, a limited resource, when performing the write to the database file and read from the database file operations.

To overcome challenges with prior methods, some aspects of the described technology automate the creation of the second backup, which is often used for future recovery actions to work properly. In the example above, this reduces the four separate operations of the load function, sometimes down to three, and reduces the six separate operations of the recover function, sometimes down to five, by removing the need to read each data item from the database file. This may reduce the overall input output processes by between 16%-25%, which may increase efficiency of computing resources by 16%-25% and further increase the processing speed, resulting in the data being available for use 16%-25% faster. Aspects that will be described herein present a new combination load and dump function that cause the transformation of the data, storage of the transformed data in the database, and the automatic generation of a second set of backup data from the transformed data. In additional or alternative embodiments, the combination load and dump function may cause the automatic generation of a second set of backup data without causing the storage of the transformed data into the database. Additionally, when the combination load and dump function is utilized, the cache memory is not required to accommodate the read function, freeing up this resource for other database operations.

Accordingly, an aspect of the present disclosure provides a method comprising receiving a request to load a database, determining a first set of backup data to load to the database, and transforming the first set of backup data into a set of transformed data. The method further comprises automatically executing a set of operations that load the database with the set of transformed data, and store the set of transformed data in a second set of backup data.

Another aspect of the present disclosure provides a system comprising a processing device coupled to the memory component, the processing device to perform operations comprising, transforming a first set of backup data into a set of transformed data, wherein the first set of backup data is accessed in response to receiving a request to load the first set of backup data to the database. The processing device is further configured to perform the operation of automatically executing a set of operations that load the database with the set of transformed data, and store the set of transformed data in a second set of backup data.

Another aspect of the present disclosure provides one or more computer storage media storing computer-readable instructions thereon that, when executed by a processor to perform a method, the method comprising transforming a first set of backup data into a set of transformed data, wherein the first set of backup data is accessed in response to receiving a request to load the first set of backup data to the database. The method further comprising automatically executing a set of operations that load the database with the set of transformed data and store the set of transformed data in a second set of backup data.

It will be realized that the methods previously described are only examples that can be practiced from the description that follows, and the examples are provided to more easily understand the technology and recognize its benefits. Additional examples are now described with reference to the figures.

FIG. 1 presents an example operating environment 100 suitable for implementing aspects of the technology, such as loading data to a database, restoring the data in a database to a previous point in time or to a previously saved backup, and generating new backup files. At a high level, the example illustrated uses database manager 126 which may transform data, and database utility 116 to load data to a database, and generate backup files of data stored in a database.

The database manager 126, also referred to as a Database Management System (DBMS), may be a software application that provides tools and services that may be used in the management of database systems including transforming data. The database utility 116 may provide an interface for users and applications to interact with the database, and in additional or alternative embodiments, may be used to interact directly with data that is stored in a database or that will be stored in a database. For example, the database utility 116 may cause data to be stored into the database, may access the data from the database, read the data from the database, or load data from an external source, such as a backup.

In embodiments, such transformations may involve encrypting or decrypting data. Encrypting data may comprise transforming data into a secure format that can only be read by an entity with the associated decryption key. Examples of encryption include symmetric-key encryption, asymmetric-key encryption along with various other methods.

The database manager 126 may cause the transformation of data prior to insertion within a database such as transforming integer data to Boolean data, or any other transformations. The database client 104 may additionally or alternatively cause the database utility 116 to perform any number of specific functions and administrative tasks, for example restoring the database from a previous backup and generating new backups, or decompressing and compressing data. The database utility 116 may perform any one of restoring a database from a backup, generating a new backup, compressing data, or decompressing data or any combination of these functions.

In embodiments, data compression is a process to reduce the size of data files by encoding information more efficiently. This may be accomplished in any number of ways. An example of which is lossless data compression. Lossless compression reduces file size without any loss of data, ensuring that the original data can be perfectly reconstructed from the compressed data. Example methods of lossless compression are Huffman coding, Lempel-Ziv-Welch (LZW) and run-length coding. This is just one example of compression and any method of data compression may be utilized. Data decompression is the process restoring compressed data back to its original form, similar to data compression, an example data decompression is lossless data decompression which restores compressed data back to its original form without loss of information. The methods such as Huffman coding, LZW and run-length coding may also be used in data decompression. This is also just an example of data decompression and any method of data decompression may be utilized.

In embodiments, the database utility 116 may be a software tool or set of tools that are designed to assist in the management, maintenance, and optimization of a database. The database utility 116 may be invoked to perform any number of functions for example backup and recovery functions, or database load and dump functions. In additional or alternative embodiments, the database utility 116 may generate backup data, load from backup data, compress data or decompress data. Backups may be generated by the database utility for example by creating a copy of the database's data and schema, which can be used to restore the database in case of data loss, corruption, or other issues. Additionally, or alternatively, the database utility 116 may compress data when generating a backup and decompress data when loading data from a previous backup.

Figure 2A:
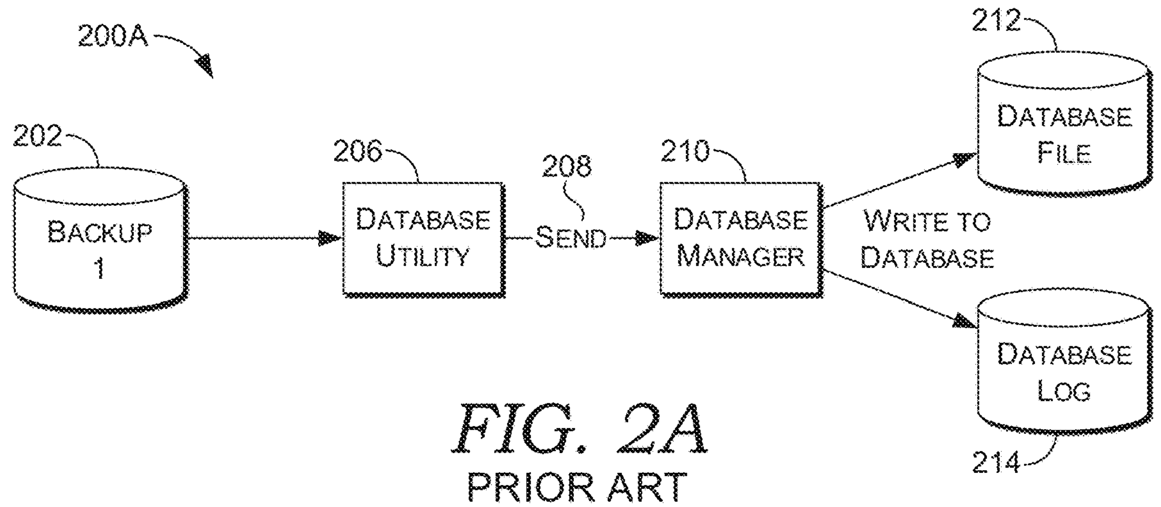
FIG. 2A PRIOR ART
FIG. 2A-2C are example of prior art database functions.
Figure 2B:
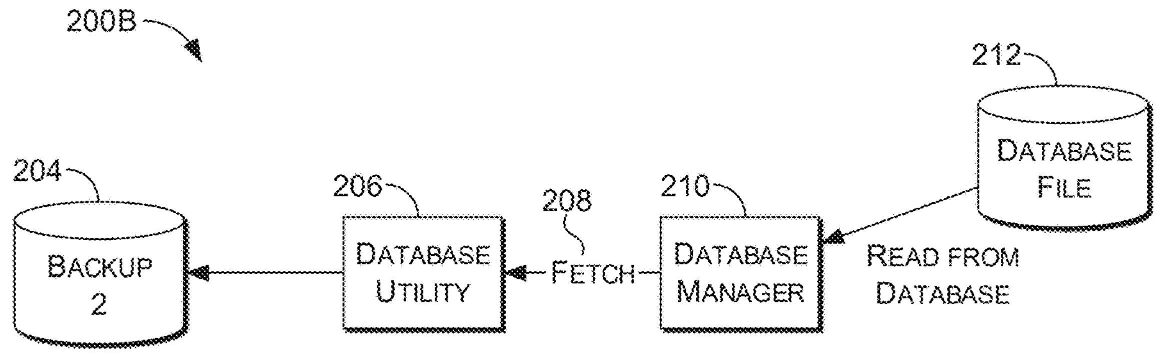
FIG. 2B PRIOR ART
Figure 2C:
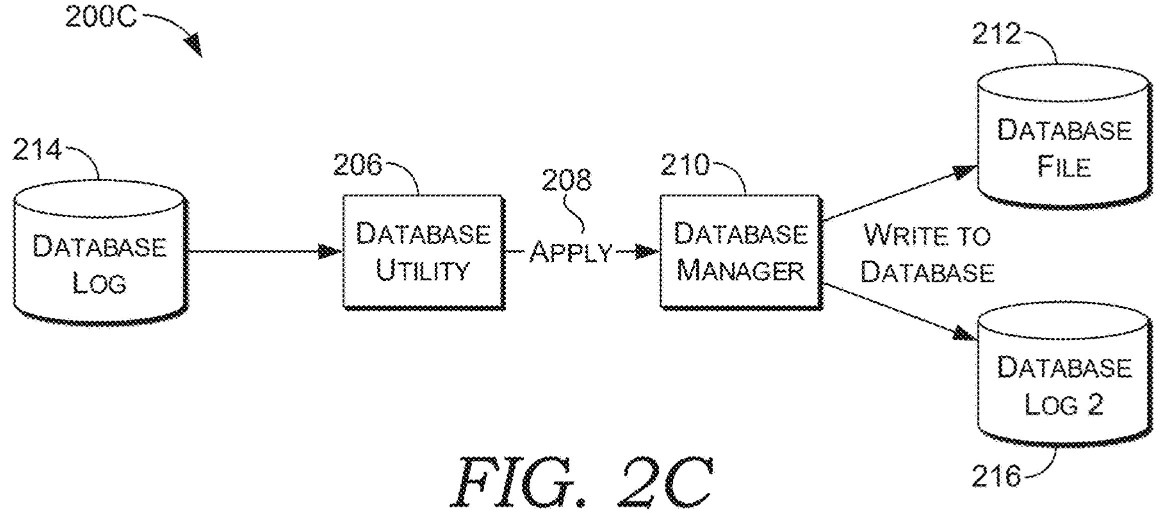
FIG. 2C PRIOR ART

FIGS. 2A-2C illustrate prior art database functions. Specifically, FIG. 2A shows an example prior art load function 200A; FIG. 2B shows a prior art dump function 200B; and FIG. 2C shows a prior art recover function 200C. As shown in FIG. 2A, the prior art load function 200A comprises utilizing a database manager 210 to invoke a database utility 206 to load data from backup 1 202. A database administrator may interact with the database manager 210 via a user interface in order to invoke the database utility 206. This prior art mechanism comprises reading the data from backup 1 202 by the database utility 206 and utilizing a send operation 208 to send the backup 1 202 to the database manager 210 to be written to the database file 212. Prior to writing the data to the database file 212, the database manager 210 transforms the backup 1 202 in any number of ways. The database manager 210 may encrypt or decrypt the data prior to loading it into the database file 212. The prior art load function additionally comprises applying the transformed data from backup 1 202 to the database log 214. The database log 214 stores incremental updates that have occurred within the database over time.

After having performed the load in FIG. 2A, as now shown in FIG. 2B, the prior art dump function 200B causes the generation of a new backup, backup 2 204. A database administrator utilizes the database manager 210 to read data from the database. This data is then fetched from the database manager 210 by the database utility 206, which then generates a backup 2 204. As mentioned above, when this prior art dump function is used after the completion of a prior art load function 200A, the data must be read from the database by the database manager 210. Additionally, the database manager 210 needs to conduct a further transformation of the data read from the database file 212 when the database file 212 is encrypted, but the backup data is not, or when the database file 212 is unencrypted and the backup requires encryption. As such, when performing a prior art dump function, the database manager 210 must read each data item from the database file 212 and is required to transform each data item prior to generating the backup 2 204. This requires additional input/output steps and computational resources to generate the backup 2 204 after the completion of the prior art load function 200A or the prior art recover function 200C. The same database utility 206 is typically utilized for both the load and dump action.

At this point, as shown in FIG. 2C, the prior art recover function 200C may be used to recover the status of the database to a preset status or time. Specifically, a database administrator invokes the database utility 206 to read data from backup 1 202 and use incremental update data from the database log 214 to apply incremental updates from the database log 214 to the database file 212. As mentioned above, the database log 214 may be comprised of sets of incremental updates that the database file 212 has undergone over a period of time. As such, applying the database log 214 to the data stored in the backup 1 202 allows the data in the backup 1 202 to be updated based on the tracked changes stored in the database log 214. Specifically, database log 214 contains incremental updates applied to the database following the load operation in FIG. 2A. In one embodiment, database utility 206 applies incremental updates using the database log 214. In a second embodiment, database utility 206 re-executes the sequence of transactions (not shown) whose operations caused the incremental updates to database file 212. During the incremental updates, the database manager 210 performs transformations of the data and writes the updated and transformed data to the database file 212. This updated and transformed data may also be applied to the database log 2 216. The load function and the recover function require a separate dump function in order to create a new backup. As with the load function 200A, when the dump function 200B is performed after the prior art recover function 200C, additional input/outputs and computational resources are needed to read and potentially transform the data by the database manager 210.

Figure 3:
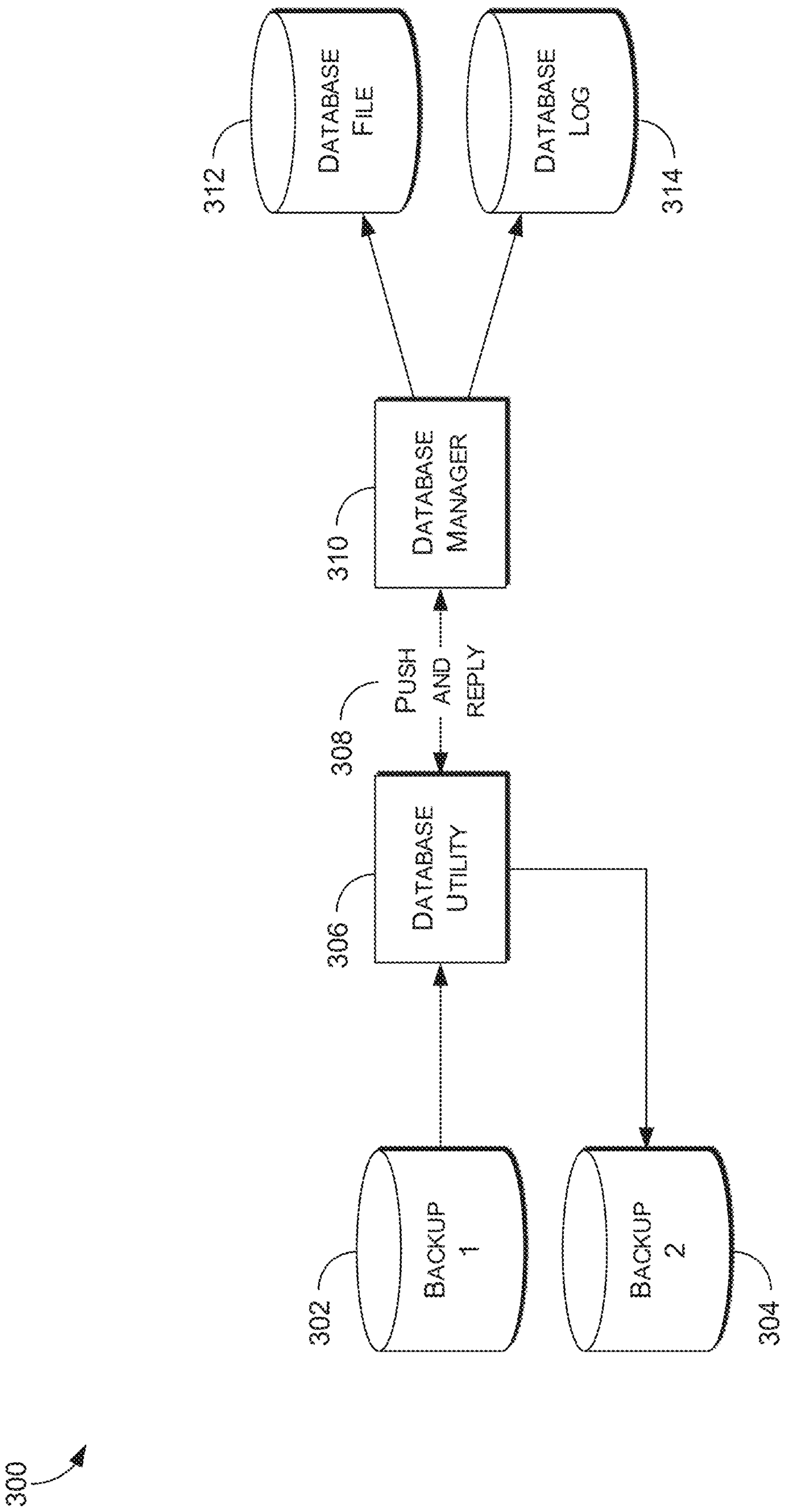
FIG. 3 illustrates an example implementation of the combination load and dump function in a database architecture, in accordance with an aspect described herein.

Turning to FIG. 3, an example implementation of the combination load and dump function in a database architecture 300 is illustrated. The present solution, as illustrated by FIG. 3, removes the need to read the data from the database file and also reduces the number of transformations by the database manager 310. This reduces the input/outputs required for generating a backup file after any function that adds data to a database or restores a database to a previous state such as with a dump or recover function. The combination load and dump function accomplishes the loading of information into a database along with the automatic dumping of data to a new backup file without the need for a further read function or the need to transform data read from the database file. As such, this combination load and dump function automates the creation of backup 2 304, which can be used for any future recover action to work properly.

As shown in FIG. 3, the combination load and dump function includes the automatic push and reply operation 308. Here, the database utility 306 pushes data from backup 1 302 to the database manager 310. The database manager 310 then transforms the data into the format required by the database and writes that transformed backup data to the database file 312. Database manager 310 further sends a reply to the database utility 306 so that the database utility 306 may utilize the transformed data to generate a backup 2 304. The incremental updates associated with the combination load and dump function may additionally or alternatively be stored in the database log 314. This eliminates the need for the additional read function performed by existing methods.

Instead, the database manager 310 transforms and then automatically replies to the database utility with the transformed data so that a backup 2 304 may be generated without the need for a further read operation by the database manager 310. The database manager 310 may cache the data into cache memory when performing the write to the database file and read from the database file operations.

The combination load and dump function may also be utilized when implementing a recover function. In embodiments, a database log such as the database log 216 may be used in the place of the Backup 1 302. In said embodiment, the database utility 306 may utilize the database log to conduct a recover function while implementing the push and reply operation 308. The database utility 306 pushes data from the database log to the database manager 310. The database manager 310 then transforms the data into a format required by the database and writes that transformed database log data to the database file 312. The database manager 310 further sends a reply to the database utility 306 so that the database utility 306 may utilize the transformed data to generate a backup 2 304. The incremental updates associated with the combination load and dump function may additionally or alternatively be stored in a new database log. This also eliminates the need for the additional read function performed by existing recover functions.

Figure 4:
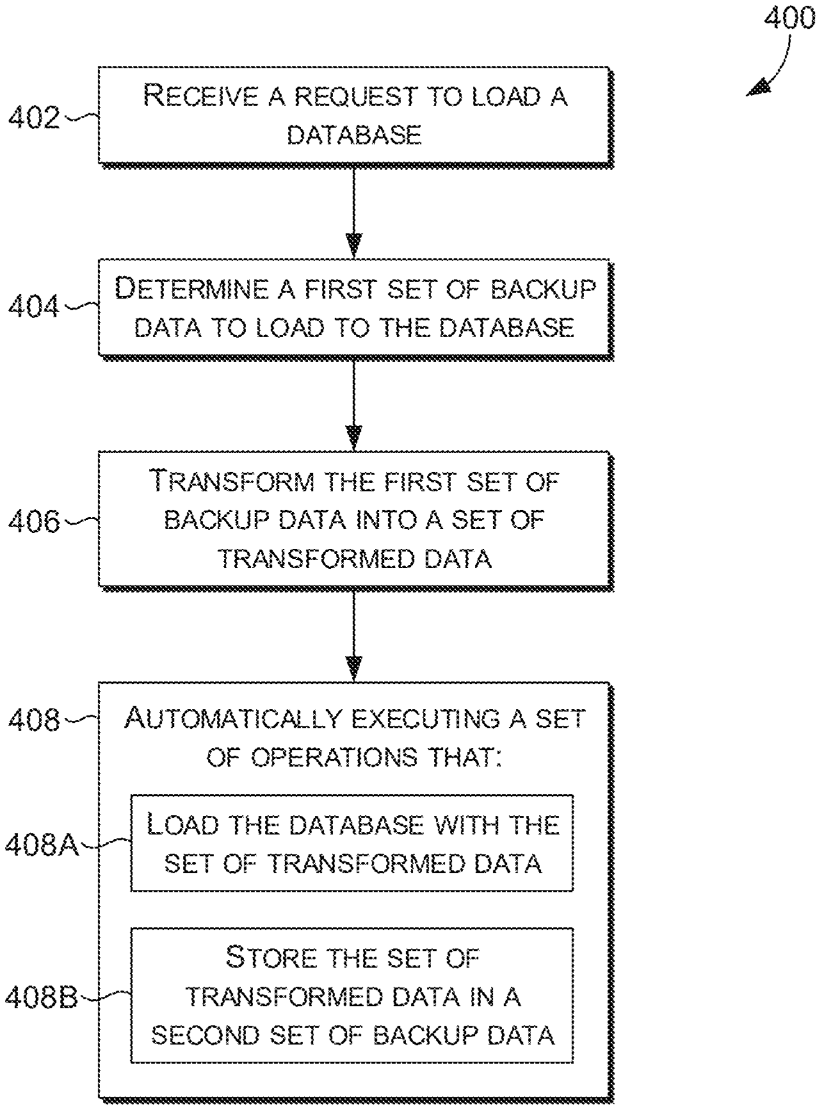
FIG. 4 illustrates an example method for performing the combination load and dump function in a database architecture, in accordance with an aspect described herein.

Turning to FIG. 4, an example method 400 for performing the combination load and dump function in a database architecture is illustrated. Each block may comprise a computing process performed using any combination of hardware, firmware, or software. For instance, method 400 can be carried out by a processor executing instructions stored in memory. Method 400 can also be embodied as computer-usable instructions stored on computer storage media. Method 400 can be provided by a standalone application, a service or hosted service (standalone or in combination with another hosted service), or a plug-in to another product, to name a few possibilities. Method 400 may be implemented in whole or in part by components of operating environment 100, such as database utility 110 and database utility 112.

At step 402, a request to load a database is received. As discussed above, a request to load a database may comprise any function that includes inserting new data into a database, restoring a database to a previous time, or state, or any other function which may change the data stored within a database. In additional or alternative embodiments, a request to apply incremental updates to a database may be received.

At step 404, a first set of backup data to load to the database is determined. The backup data may comprise any number of or sets of data in various forms, which may be stored in association with a database. In additional or alternative embodiments, the request to load data may be associated with any set of data to be loaded to a database, such as data from a separate database or third party data source. In embodiments, the request to load data may be associated with a database log.

At step 406, the first set of backup data is transformed into a set of transformed data. In embodiments, transforming the first set of backup data may comprise compressing or decompressing the data, encrypting or decrypting the data, or other forms of transformations, for example changing the data from an integer data type to a Boolean data type.

At step 408, a set of operations are automatically executing. The set of operations comprise step 408A, which loads the database with the set of transformed data, and step 408B, which stores the set of transformed data in a second set of backup data. In embodiments, the set of operations are performed without reading the set of data in the second form from the database. In embodiments, the automatic execution of the set of operations may be executed base on receiving an input from a user. In additional or alternative embodiments, storing the set of transformed data in the second set of backup data may comprise compressing or decompressing the set of transformed data. In embodiments, the set of operations may include generation of a new database log.

Figure 5:
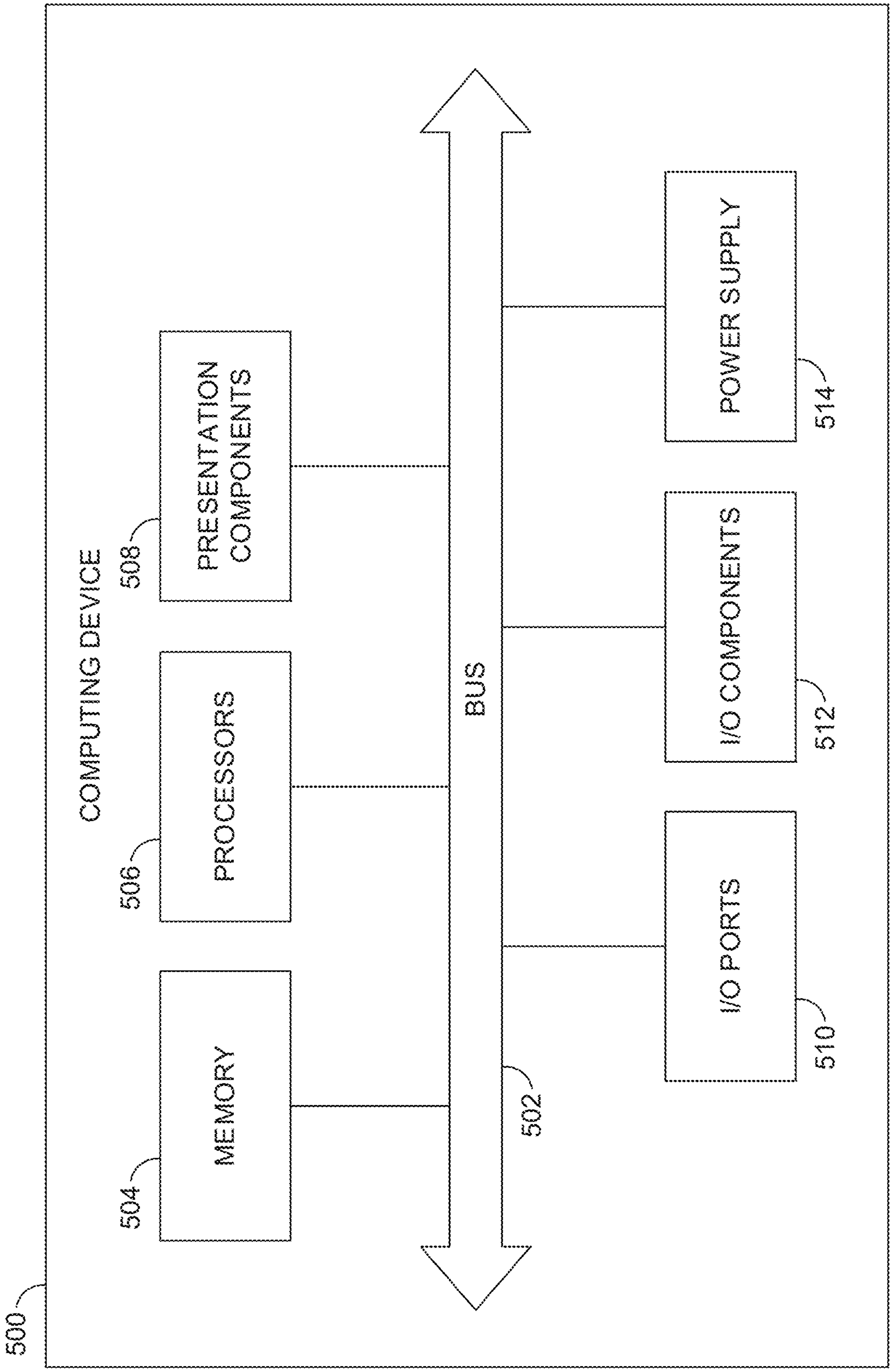
FIG. 5 illustrates an example computing device suitable for implementing aspects of the technology.

Having described an overview of some embodiments of the present technology, an example computing environment in which embodiments of the present technology may be implemented is described below in order to provide a general context for various aspects of the present technology. Referring now to FIG. 5 in particular, an example computing for implementing embodiments of the present technology is shown and designated generally as computing device 500. Computing device 500 is but one example of a suitable computing environment and is not intended to suggest any limitation as to the scope of use or functionality of the technology. Computing device 500 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant, or other handheld device. Generally, program modules, including routines, programs, objects, components, data structures, etc., refer to code that performs particular tasks or implements particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

With reference to FIG. 5, computing device 500 includes bus 502, which directly or indirectly couples the following devices: memory 504, one or more processors 506, one or more presentation components 508, input/output (I/O) ports 510, input/output components 512, and illustrative power supply 514. Bus 502 represents what may be one or more buses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 5 is merely illustrative of an example computing device that can be used in connection with one or more embodiments of the present technology. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and non-volatile media, and removable and non-removable media. By way of example, and not limitation, computer-readable media may comprise computer storage media and communication media. Computer storage media, also referred to as a communication component, includes both volatile and non-volatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVDs), or other optical disk storage; magnetic cassettes, magnetic tape, magnetic disk storage, or other magnetic storage devices; or any other medium that can be used to store the desired information and that can be accessed by computing device 500. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 504 includes computer storage media in the form of volatile or non-volatile memory. The memory may be removable, non-removable, or a combination thereof. Example hardware devices include solid-state memory, hard drives, optical-disc drives, etc. Computing device 500 includes one or more processors that read data from various entities, such as memory 504 or I/O components 512. Presentation component(s) 508 presents data indications to a user or other device. Example presentation components include a display device, speaker, printing component, vibrating component, etc.

I/O ports 510 allow computing device 500 to be logically coupled to other devices, including I/O components 512, some of which may be built-in. Illustrative components include a microphone, joystick, game pad, satellite dish, scanner, printer, wireless device, etc. The I/O components 512 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 500. Computing device 500 may be equipped with depth cameras, such as stereoscopic camera systems, infrared camera systems, RGB (red-green-blue) camera systems, touchscreen technology, other like systems, or combinations of these, for gesture detection and recognition. Additionally, the computing device 500 may be equipped with accelerometers or gyroscopes that enable detection of motion. The output of the accelerometers or gyroscopes may be provided to the display of computing device 500 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher-level software, such as application software; and any combination thereof. Any other variations and combinations thereof are contemplated within embodiments of the present technology.

With reference back to FIG. 1, an example operating environment 100 in which aspects of the technology may be employed is provided. Among other components or engines not shown, operating environment 100 comprises server 102, client device 104, and database 106, which communicate via network 108.

Generally, server 102 is a computing device that implements functional aspects of operating environment 100. In aspects, server 102 may perform functions described with respect to database utility 110 and database utility 112. One suitable example of a computing device that can be employed as server 102 is described as computing device 500 with respect to FIG. 5.

Client device 104 is generally a computing device, such as computing device 500 of FIG. 5. Client device 104 may perform various functions, such as transmitting data for insertion into database 106. In aspects, client device 104 may perform functions described with respect to database utility 110 and database utility 112.

As with other components of FIG. 1, server 102 and client device 104 are each intended to represent one or more devices. In implementations, client device 104 is a client-side or front-end device, and server 102 represents a back-end or server-side device. It will be understood that some implementations of the technology will comprise either a client-side or front-end computing device, a back-end or server-side computing device, or both, executing any combination of functions described herein. FIG. 1 is simply one example illustration of a computing environment in which the technology may be employed, although it will be recognized that other arrangements of devices and functions may be used with the technology as well. All are intended to be within the scope of the present disclosure, as will be further noted.

Database 106 generally stores information, including data, computer instructions (e.g., software program instructions, routines, or services), or models used in embodiments of the described technologies. Although depicted as a single database component, database 106 may be embodied as one or more databases or may be in the cloud.

Network 108 may include one or more networks (e.g., public network or virtual private network [VPN]), as shown with network 108. Network 108 may include, without limitation, one or more local area networks (LANs), wide area networks (WANs), or any other communication network or method.

With continued reference to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to database utility 110 and database utility 112, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of database utility 110 and database utility 112, among other functions, may be performed by server 102, client device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the words "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving" or "transmitting," as facilitated by software or hardware-based buses, receivers, or transmitters using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well-adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

What is claimed is:

1. A method comprising:

receiving, by a processor, a request to load a database;

determining, by the processor, a first set of backup data to load to the database;

transforming, by the processor, the first set of backup data into a set of transformed data; and automatically executing, by the processor, a set of operations that load the database with the set of transformed data and store the set of transformed data as a second set of backup data thereby creating a new backup file without reading the set of transformed data from the database after loading and freeing up cache memory resource for other database operations.

2. The method of claim 1, wherein:

transforming the first set of backup data comprises decompressing the first set of backup data; and storing the set of transformed data as the second set of backup data comprises compressing the set of transformed data.

3. The method of claim 1, wherein the first set of back up data is transformed into the set of transformed data, and the set of operations are automatically executed based on receiving an input from a user.

4. The method of claim 1, wherein transforming the first set of backup data into the set of transformed data comprises encrypting the first set of backup data.

5. The method of claim 1, wherein transforming the first set of backup data into the set of transformed data comprises transforming integer data to Boolean data.

6. The method of claim 1, wherein the request to load comprises a request to recover the database to a previous state.

7. A system comprising:

a processing device coupled to a memory component, the memory component having instructions stored thereon that cause the processing device to perform operations comprising:

transforming a first set of database log data into a set of transformed database log data, wherein the first set of database log data is accessed in response to a request to recover the database; and automatically executing a set of operations that load the database with the set of transformed database log data and store the set of transformed database log data as a second set of database log data thereby generating a new database log without reading the set of transformed database log data from the database after loading and freeing up cache memory resource for other database operations:

load the database with the set of transformed database log data; and store the set of transformed database log data as a second set of database log data.

8. The system of claim 7, wherein:

transforming the first set of database log data comprises decompressing the first set of database log data; and storing the set of transformed database log data in the second set of database log data comprises compressing the set of transformed database log data.

9. The system of claim 7, wherein the first set of database log data is transformed into the set of transformed database log data, and the set of operations are automatically executed based on receiving an input from a user.

10. The system of claim 7, wherein transforming the first set of database log data into the set of transformed database log data comprises encrypting the first set of database log data.

11. The system of claim 7, wherein transforming the first set of database log data into the set of transformed database log data comprises transforming integer data to Boolean data.

12. The system of claim 7, wherein the request to recover comprises a request to restore the database to a previous state.

13. One or more computer storage media storing computer-readable instructions thereon that, when executed by a processor, cause the processor to perform a method, the method comprising:

transforming a first set of backup data into a set of transformed data, wherein the first set of backup data is accessed in response to a request to load the first set of backup data to the database; and automatically executing a set of operations that load the database with the set of transformed data and store the set of transformed data as a second set of backup data thereby creating a new backup file without reading the set of transformed data from the database after loading and freeing up cache memory resource for other database operations.

14. The media of claim 13, wherein:

transforming the first set of backup data comprises decompressing the first the first set of backup data; and storing the set of transformed data in the second set of backup data comprises compressing the transformed data.

15. The media of claim 13, wherein the first set of backup data is transformed into the set of transformed data, and the set of operations are automatically executed based on receiving an input from a user.

16. The media of claim 13, wherein transforming the first set of backup data into the set of transformed data comprises encrypting the first set of backup data.

17. The media of claim 13, wherein transforming the first set of backup data into the set of transformed data comprises transforming integer data to Boolean data.

* * * * *